(12) United States Patent
Kloepfer et al.

(10) Patent No.: US 11,858,727 B2
(45) Date of Patent: Jan. 2, 2024

(54) CARGO CONTAINER NOSE CONE ASSEMBLY

(71) Applicants: Michael Kloepfer, Delhi (CA); James Bult, Monee, IL (US)

(72) Inventors: Michael Kloepfer, Delhi (CA); James Bult, Monee, IL (US)

(73) Assignees: Michael Kloepfer, Delhi (CA); James Bult, Monee, IL (US)

( * ) Notice: Subject to any disclaimer, the term of this patent is extended or adjusted under 35 U.S.C. 154(b) by 221 days.

(21) Appl. No.: 16/773,320

(22) Filed: Jan. 27, 2020

(65) Prior Publication Data

US 2020/0239226 A1 Jul. 30, 2020

Related U.S. Application Data

(60) Provisional application No. 62/797,612, filed on Jan. 28, 2019.

(51) Int. Cl.
*B65D 90/08* (2006.01)
*B65D 88/12* (2006.01)
*B65D 90/54* (2006.01)

(52) U.S. Cl.
CPC ............. *B65D 90/08* (2013.01); *B65D 90/54* (2013.01)

(58) Field of Classification Search
CPC ...... B65D 90/08; B65D 90/54; B65D 90/024; B65D 88/08
USPC ..................... 220/4.12, 4.13, 4.16
See application file for complete search history.

(56) References Cited

U.S. PATENT DOCUMENTS

| | | | |
|---|---|---|---|
| 3,178,050 A * | 4/1965 | Ernst ..................... | B65D 90/08 220/4.13 |
| 3,233,907 A * | 2/1966 | Stanton ............... | F16L 27/1275 277/616 |
| 3,971,491 A | 7/1976 | Mowatt-Larssen et al. | |
| 5,047,101 A | 9/1991 | Trussler | |
| 5,121,852 A * | 6/1992 | Wilkes .................. | B01D 35/30 220/684 |
| 7,975,622 B2 | 7/2011 | Dalrymple et al. | |
| 8,313,595 B2 | 11/2012 | Blanc et al. | |
| 9,789,916 B1 | 10/2017 | Beelman et al. | |

(Continued)

FOREIGN PATENT DOCUMENTS

| | | |
|---|---|---|
| EP | 2236439 B1 | 5/2012 |
| WO | 2013/083177 A1 | 6/2013 |

(Continued)

*Primary Examiner* — Andrew D Perreault
(74) *Attorney, Agent, or Firm* — McCarter & English, LLP (57) ABSTRACT

A cargo container has a tubular shell, an annular mounting ring mounted thereto, and a nose cone clamped to the annular mounting ring by an annular clamping collar. The mounting ring has a coupling slot and an annular flange. The nose cone has an annular flange. The clamping collar has an inwardly facing annular groove, and a constriction device. The mounting ring is mounted to the tubular shell wherein an annular edge of the tubular shell is rigidly held in the coupling slot. The nose cone and mounting ring annular flanges together form a mounting wedge. The clamping collar clamps the nose cone to the annular mounting ring wherein the mounting wedge is rigidly held in the annular groove by constriction of the clamping collar by the constriction device.

20 Claims, 6 Drawing Sheets

FIG. 5

(56) References Cited

U.S. PATENT DOCUMENTS

| | | |
|---|---|---|
| 2013/0193685 A1* | 8/2013 | Bird .................. F16L 21/022 |
| | | 285/337 |
| 2013/0206778 A1 | 8/2013 | Lukyanets et al. |
| 2017/0254477 A1 | 9/2017 | Schimenti et al. |
| 2017/0299057 A1 | 10/2017 | Doetzer |
| 2018/0017214 A1 | 1/2018 | Hermiller et al. |
| 2018/0187835 A1 | 7/2018 | Brunsch |

FOREIGN PATENT DOCUMENTS

| | | |
|---|---|---|
| WO | 2014/139531 A1 | 9/2014 |
| WO | 2016/118152 A1 | 7/2016 |
| WO | 2016/170192 A1 | 10/2016 |
| WO | 2016/173587 A1 | 11/2016 |

* cited by examiner

CARGO CONTAINER NOSE CONE ASSEMBLY

RELATED APPLICATIONS

This application claims priority to U.S. Provisional Patent Application Ser. No. 62/797,612 filed on Jan. 28, 2019, the entire disclosure of which is hereby expressly incorporated by reference.

BACKGROUND

Technical Field

The present disclosure relates generally to cylindrical cargo containers including cylindrical cargo containers for tanker trucks, trailers, and railcars, as well as tanker trucks, trailers, and railcars having cylindrical cargo containers.

Related Art

Cylindrical cargo containers, such as the containers for tanker (or tank) trucks, trailers, and railcars, are widely used to transport various materials such as liquefied loads, dry bulk cargo, or gases on roads or rails. Whether incorporated in a tanker truck where the container is mounted on a chassis and wheeled suspension commonly with the truck, or a tanker trailer where the container is mounted on its own chassis and wheeled suspension which is towed by a tractor, or a railroad tanker car, the container is typically cylindrical in shape and is mounted on and supported by a chassis and wheeled suspension. Other configurations are possible.

Cylindrical cargo containers have many advantages which explain their widespread use. Based on simple geometry, for any given volume a cylinder has a smaller surface area than a typical rectangular, box-shaped cargo container. As such, all other factors being equal, a cylindrical container can have both a higher ratio of cargo weight to container weight, and of cargo weight to container materials than a container of another shape. Moreover, cylindrical containers typically have a more aerodynamic shape. Both of these factors result in a lesser towing or carrying load, and thus lesser truck or tractor power requirements, and better fuel economy.

Typically, such cylindrical containers have a construction including a skin formed of a rigid and resilient plate material, usually metal, such as rolled sheet steel or aluminum, and a frame structure, such as annular and longitudinal ribbed beam structure, which may include vertical bands or ribs, to provide shape and strength, and to support the skin, which is affixed to the frame, sometimes by welds. In other cases, a less sturdy and resilient material is used, such as fiberglass or reinforced plastic. In any event, the frame is typically mounted on and supported by the chassis of the truck, trailer, or railcar, and thus the weight of any load contained by the tank is communicated to the chassis ultimately by this frame.

PCT International Publication No. WO 2018/112622 A1 ("the PCT Publication"), the entirety of which is incorporated herein by reference, discloses a cylindrical cargo container having a generally cylindrical shape formed of longitudinal extruded panels. Each panel has a traverse cross-sectional profile which is generally arcuate in shape, and all of the panels have a common arc radius, or degree of curvature, such that when assembled they form a cylindrical tube. In some embodiments, each panel has an outer skin, an inner skin, and a plurality of webs spanning the outer skin and the inner skin. The panels are formed of any suitable material, which may be a metal, which may be steel or aluminum.

In some embodiments, the cylindrical container disclosed in the PCT Publication has a front wall which may be formed so as to be generally conical in shape, or with separate sloped sections. The front wall may be formed with a smooth continuous surface or with a ridged surface. The front wall may have a single sheet of material, such as sheet metal, formed into the desired shape, or may instead be formed of a plurality of panels, which may be extruded panels, and assembled and fastened, cemented, or welded into the desired shape.

The cylindrical container for a truck, trailer, or railcar disclosed in the PCT Publication has numerous advantages. It may be made smooth inside and outside, with optimal aerodynamics. Compared to traditional tanker containers it may also have reduced weight. Both of these advantages may result in better fuel economy. The extruded panels, having inner and outer skins, may provide impact protection from without, and as well content retention protection from within, in the event of puncturing impacts. It may be straightforward and cost-effective to provide linear items, such as rails for mounting to the chassis, or for mounting landing gear or a hitch, by including them in the extrusion profile of one or more of the panels.

While the container, tanker truck, trailer, and railcar disclosed in the PCT Publication overcomes many of the drawbacks and provides further advantages over prior teachings, there remains a need for efficient and reliable methods of manufacturing cylindrical cargo containers which reduce cost through reduced weight while enabling flexibility of materials and configurations providing advantages in a wide array of applications.

SUMMARY

A cargo container has a tubular shell, an annular mounting ring mounted thereto, and a nose cone clamped to the annular mounting ring by an annular clamping collar. The mounting ring has a coupling slot and an annular flange. The nose cone has an annular flange. The clamping collar has an inwardly facing annular groove, and a constriction device. The mounting ring is mounted to the tubular shell wherein an annular edge of the tubular shell is rigidly held in the coupling slot. The nose cone and mounting ring annular flanges together form a mounting wedge. The clamping collar clamps the nose cone to the annular mounting ring wherein the mounting wedge is rigidly held in the annular groove by constriction of the clamping collar by the constriction device.

BRIEF DESCRIPTION OF THE DRAWINGS

The foregoing features of the invention will be apparent from the following Detailed Description, taken in connection with the accompanying drawings, in which.

Throughout the drawings, sometimes only one or fewer than all of the instances of an element visible in the view are designated by a lead line and reference character, for the sake only of simplicity and to avoid clutter. It will be understood, however, that in such cases, in accordance with the corresponding description, that all other instances are likewise designated and encompassed by the corresponding description.

DETAILED DESCRIPTION

A cylindrical cargo container with a nose cone assembly is disclosed herein.

Figure 1:
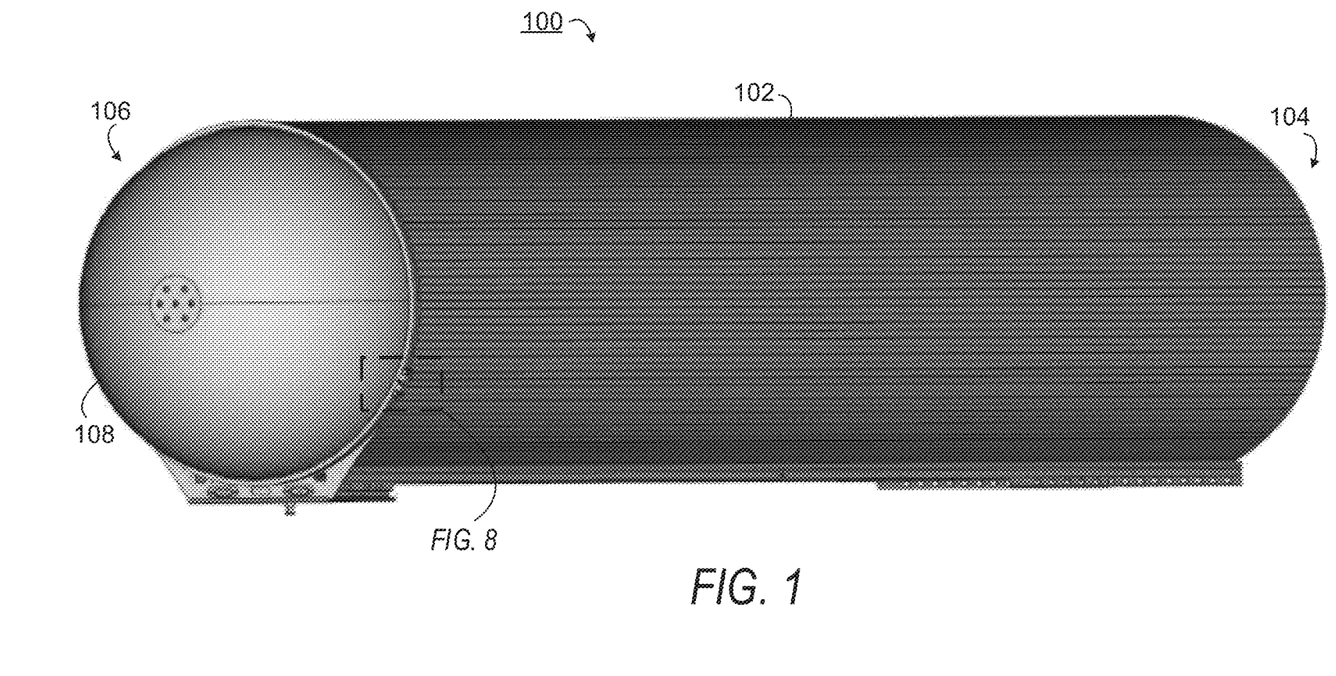
FIG. 1 shows a perspective view of a cargo container as disclosed herein.

FIG. 1 shows a cylindrical cargo container 100. The container 100 has a cylindrical, tubular shell 102 with a rear end 104 and a front end 106. The tubular shell 102 may form at the front end 106 a generally circular opening (not shown). The container 100 also has a nose cone 108 closing the circular opening of the front end 106.

As described below and shown in the drawings, many of the components of the container 100 possess a generally cylindrical symmetry, thus defining a longitudinal axis coincident with an axis of circular symmetry, and having a generally circular transverse cross-section, thereby defining an axial direction extending along the longitudinal axis, and a radial direction extending radially from the longitudinal axis in a plane of the cross-section. The terms "longitudinal", "axial", and "radial", or their analogues, are used hereinafter in these senses. Likewise, the cargo container will typically have a front, or forward, longitudinal end, being that end having or intended to have the nose cone, and a rear, or rearward, longitudinal end, being that end longitudinally opposite the front. Thus, the terms "front", "forward", "rear", and "rearward", and used hereinafter in these senses.

Figure 2:
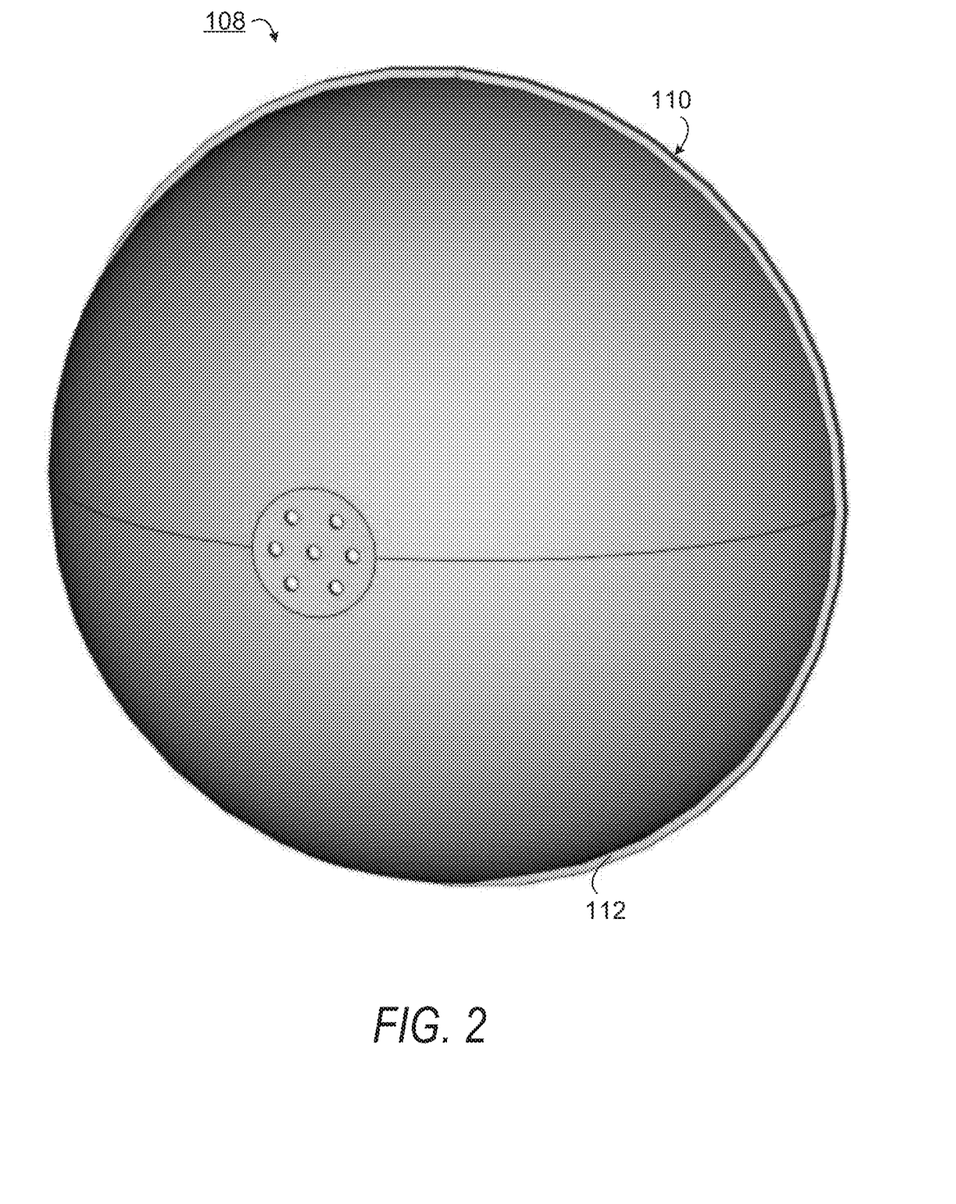
FIG. 2 shows a perspective view of a nose cone as disclosed herein.

FIG. 2 shows the nose cone 108 in isolation from the container 100. The nose cone 108 may be generally hemispherical, as shown, paraboloid, conical, or may have any other shape, be generally round, segmented or smooth, so long as it provides an open end (facing generally into the page) with a generally circular rim 110 matching the circular opening of the front end 106 of the tubular shell 102 of the container 100. Specifically, the circular rim 110 of the nose cone 108 and the circular opening of the tubular shell 102 may have a common radius and thus circumference. The nose cone 108 also has a nose cone annular flange 112 (shown particularly in FIGS. 2 and 5) extending and tapering radially outwardly from the circular rim 110. The nose cone 108 may be formed of any suitable materials, which may be a material different from the material of the tubular shell 102, and in particular may be formed from plastic, which may be fiber-reinforced plastic, which may be fiberglass, which may be high strength fiberglass. The tubular shell 102 may be formed of any suitable material, which may be metal, which may be steel or aluminum. In particular, the tubular shell 102 may be formed from a plurality of extruded panels, which may be aluminum panels, which may be hollow-core extruded aluminum panels substantially as disclosed in the PCT Publication. In some embodiments, the nose cone 108 may be formed of a material that is the same as or similar to the material of the tubular shell 102. For example, the nose cone 108 may alternatively be formed from metal, which may be steel or aluminum.

Figure 3:
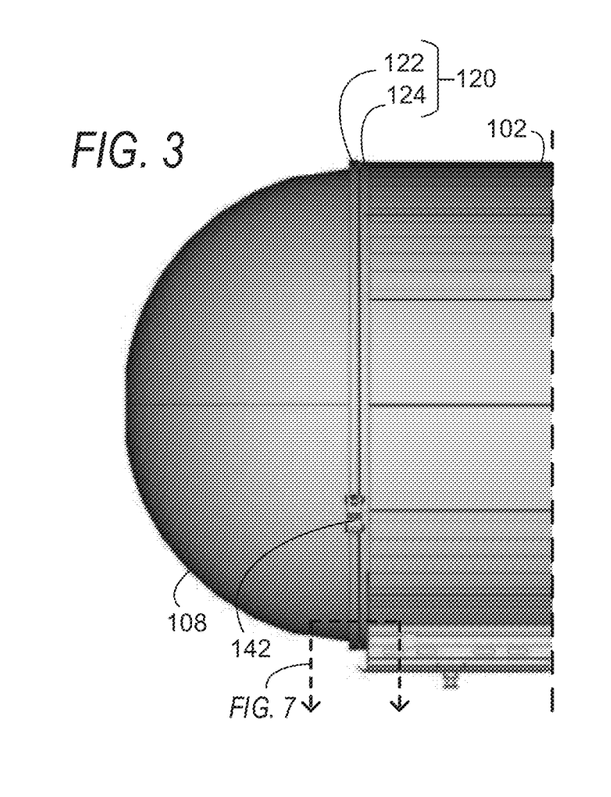
FIG. 3 shows a partial side of view of the cargo container of FIG. 1.
Figure 4:
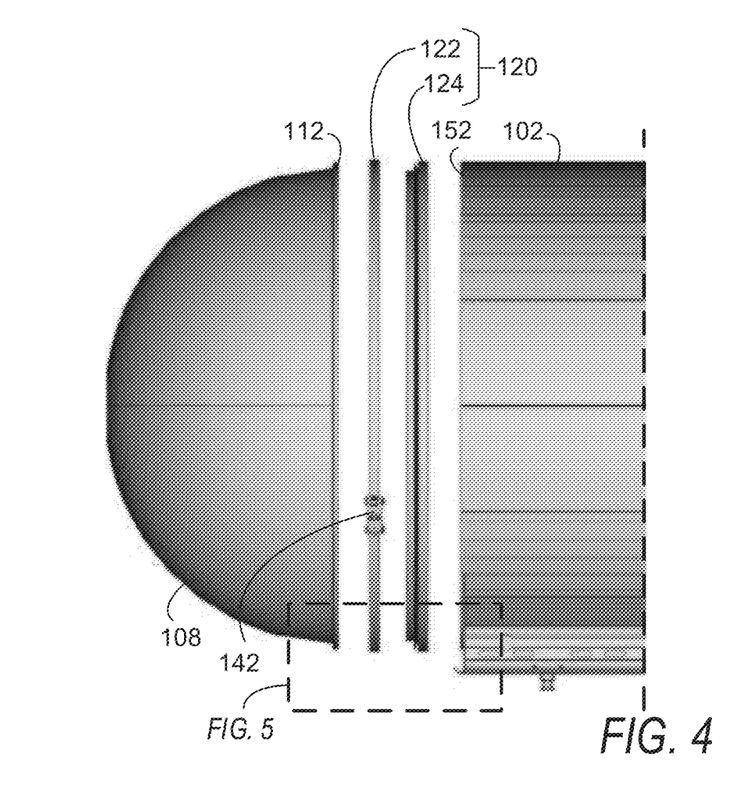
FIG. 4 shows an exploded view of FIG. 3.
Figure 5:
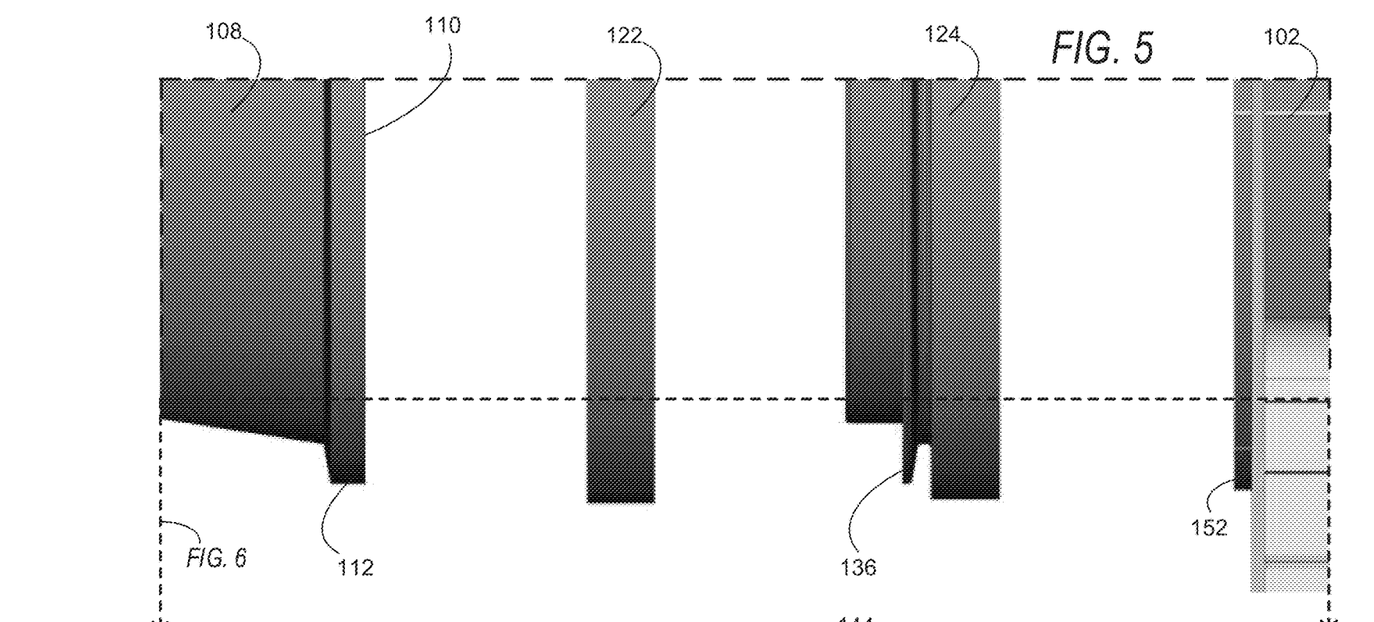
FIG. 5 shows a detail of the exploded view of FIG. 4.

As shown particularly in FIGS. 3-5, the nose cone 108 may be securely and reversibly mounted to the tubular shell 102 by use of a mounting apparatus 120 including an annular clamping collar 122 and annular mounting ring 124. As shown particularly in FIGS. 6 and 7, the clamping collar 122 may have a generally U-shaped cross-section including axially opposing arms 126 joined at respective radially outward ends by a transversely extending base 128, together forming a radially inwardly facing opening 130, and defining a generally U-shaped annular groove 134 with an interior surface 132, wherein the annular groove 134 tapers radially outwardly.

As indicated above, the nose cone 108 has a nose cone annular flange 112, which may be sized and shaped to be received in the annular groove 134 of the clamping collar 122. The annular mounting ring 124 may have a mounting ring annular flange 136 which extends and tapers radially outwardly. As shown particularly in FIG. 7, when the nose cone 108 and annular mounting ring 124 are axially aligned, and an axially rearward annular face 137 of the nose cone annular flange 112 is moved into contact with an opposing axially forward annular face 139 of the mounting ring annular flange 136, the nose cone annular flange 112 and the mounting ring annular flange 136 may together form an annular radially outwardly tapered mounting wedge 140 sized and shaped to be received in the annular groove 134 of the clamping collar 122.

As shown particularly in FIGS. 1, 3, 4 and 8, the clamping collar 122 may have a constriction device 142 operative selectively to constrict the clamping collar 122, thereby to decrease a diameter and thus circumference of the annular groove 134, or to expand the clamping collar 122, thereby to increase a diameter and thus circumference of the annular groove 134. For example, as shown particularly in FIG. 8, the constricting device 142 may include blocks 158, which may be fixedly or hingedly mounted respectively at each of two opposing ends 160 of the clamping collar 122, and a threaded bolt 162 passing through holes in the two blocks 158 and cooperating either with a threaded hole in an opposing one of the blocks 158 or with a nut disposed at an opposite end of the block 158, such that advancement of the bolt 162 tends to close a distance between the two blocks 158 and thus the opposing ends 160, thereby constricting the clamping collar 122. Other devices and arrangements are possible, which are operative reversibly to constrict the clamping collar 122. For example, the constructing device 142 may include a latch clamp or a toggle clamp.

Thus, when in a relatively expanded state, the clamping collar 122 may have an expanded circumference, and accordingly a generally circular opening having an expanded diameter, which, when in axial alignment with the assembled nose cone 108 and annular mounting ring 124, provides a sufficiently wide axially facing opening to permit passage of the clamping collar 122 axially over the assembled nose cone 108 and annular mounting ring 124 and about the formed tapered mounting wedge 140, thereby to radially oppose the tapered mounting wedge 140 and the annular groove 134. Then, the constriction device 142 may be operated to constrict the clamping collar 122, causing a decrease in the effective circumference of the annular groove 134, whereby it constricts radially inwardly and circumferentially receives the tapered mounting wedge 140 past the radially inward opening 130 and into the annular groove 134. As the constriction device 142 is further operated to further constrict the clamping collar 122, an exterior surface 163 of the mounting wedge 140 come into contact with the opposing interior surface 132 forming the annular groove 134, thereby guiding the mounting wedge 140 into the annular groove 134. As the constriction device 142 is yet further operated, the exterior surface 163 of the mounting wedge 140 presses the opposing interior surface 132 of the annular groove 134, causing clamping force between the nose cone annular flange 112 and the mounting ring annular flange 136, whereby the clamping collar 122 operates to clamp rigidly the nose cone annular flange 112 and the mounting ring annular flange 136 together. In this way, the clamping collar 122 with constricting device 142 is operable to clamp reversibly the nose cone 108 onto the annular mounting ring 124 in axial alignment.

The nose cone 108 may be formed of a material with sufficient flexibility such that the above-described method of clamping the nose cone 108 onto the annular mounting ring 124 may cause the nose cone 108 to deform, which may include, at or near its opening—that is, proximal its generally circular rim 110—deflection of the generally circular rim 110 radially inwardly. As shown particularly in FIG. 7, the annular mounting ring 124 may therefore have an annular clamping stop 144 formed radially inwardly from, and projecting axially forwardly from, the mounting ring annular flange 136, such that when the annular mounting ring 124 and nose cone 108 are assembled as described above to form the tapered mounting wedge 140, the annular clamping stop 144 may be positioned radially behind, that is radially inwardly from, the nose cone annular flange 112. Thus, in the event that clamping of the nose cone 108 onto the annular mounting ring 124 by the clamping collar 122 causes deflection of the circular rim 110 radially inwardly, a radially inward surface 145 of the nose cone 108 at or near the circular rim 110 may contact a radially outward surface 147 of the annular clamping stop 144, thereby preventing or resisting further radially inward deflection of the circular rim 110. Moreover, the contact between the radially inward surface 145 of the nose cone 108 and the radially outward surface 147 of the annular clamping stop 144 may form a seal to prevent or resist passage of contents of the container 100 outside the container at the joint formed between the nose cone 108 and the annular mounting ring 124. Forming such a seal may be desirable or necessary when the container 100 is intended to contain cargo which generates leachate which is characterized as an environmental hazard, as may be the case where the cargo is municipal or industrial waste. In order to improve this seal, at least one of the radially inward surface 145 of the nose cone 108, the radially outward surface 147 of the annular clamping stop 144, the axially rearward annular face 137 of the nose cone annular flange 112, the axially forward annular face 139 of the mounting ring annular flange 136, and the interior surface 132 forming the annular groove 134 may be lined with, be provided with, be coated by, or have mounted thereto, a sealing means or sealing material to facilitate or improve the seal formed by that surface with the corresponding opposing contacting surface.

The annular mounting ring 124 may be formed of any suitably durable, rigid material, which may be metal, which may be steel or aluminum, and which may be a material different from either or both of the respective materials of the nose cone 108 and tubular shell 102 of the container 100.

Thus, by the structures and methods described above, the nose cone 108 may be reversibly, but durably and rigidly clamped, to annular mounting ring 124 by use of the clamping collar 122.

Figure 6:
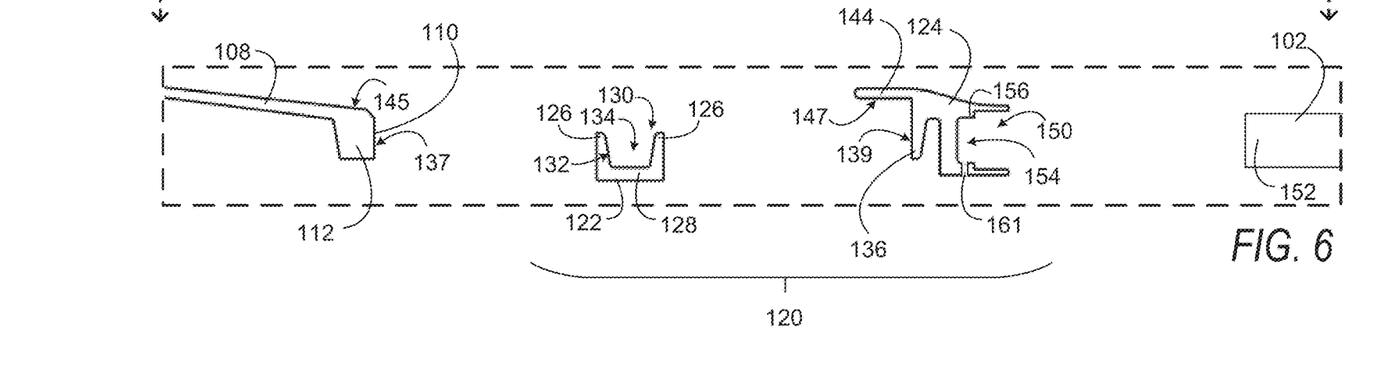
FIG. 6 shows a cross-sectional view of the exploded detail view of FIG. 5.
Figure 7:
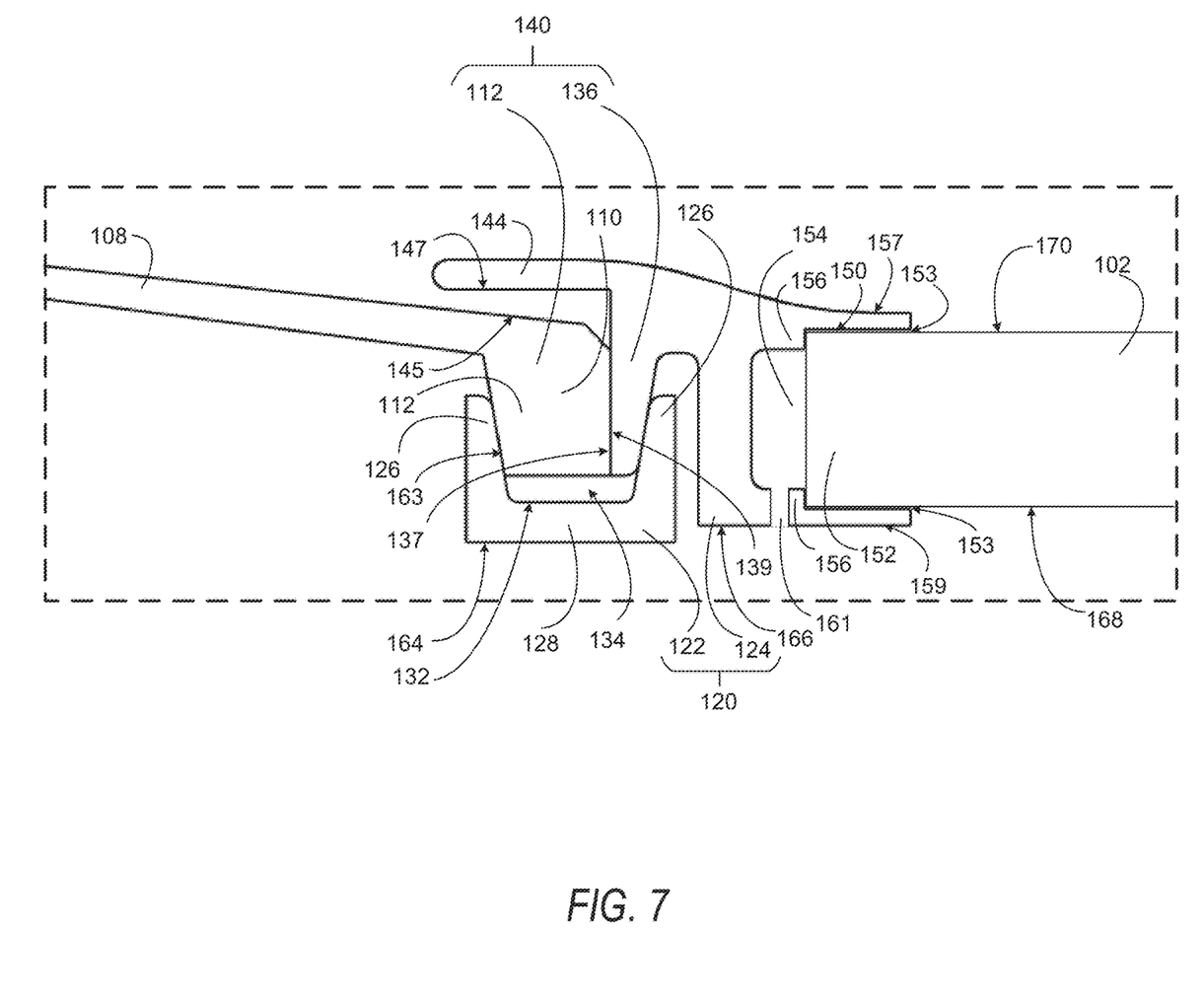
FIG. 7 shows a cross-sectional detail view of the view of FIG. 3.
Figure 8:
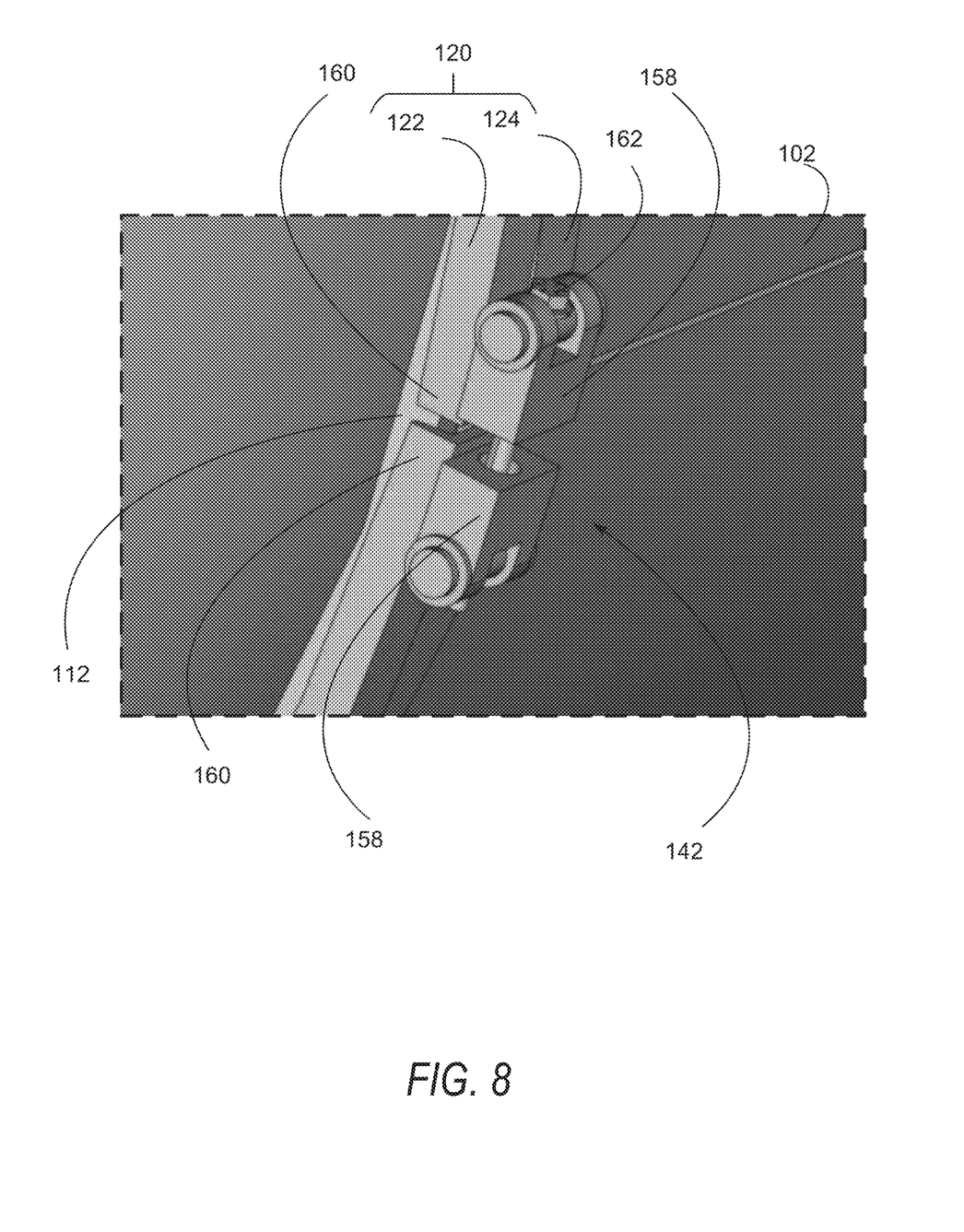
FIG. 8 shows a detail view of the view of FIG. 1 showing a constricting device.

As shown particularly in FIGS. 5-7, the annular mounting ring 124 may further have an annular coupling slot 150 sized and shaped slidingly and fittingly to receive a forward annular edge 152 of the tubular shell 102 of the container 100 when the annular mounting ring 124 is moved in axial alignment with the tubular shell 102 with the annular coupling slot 150 opposing the forward annular edge 152. The annular mounting ring 124 thus coupled, or mounted, to the tubular shell 102 may be reversibly affixed to the tubular shell 102 so as rigidly to maintain the annular mounting ring 124 in the mounted and coupled state. For example, the annular mounting ring 124 may be affixed to the tubular shell 102 using fasteners (not shown), for example bolts, and the annular mounting ring 124 may be provided with at least one, which may be a plurality of, through holes (not shown) for the passage of bolts, and the tubular shell 102 may be provided with corresponding at least one, which may be a plurality, of threaded holes (not shown), to receive threadingly and reversibly at least one, which may be a plurality, of bolts. The through holes and corresponding threaded holes may be distributed circumferentially, or otherwise positioned, about the respective circumferences of the annular mounting ring 124 and tubular shell 102 for respective alignment when the annular mounting ring 124 is in the mounted and coupled state. Other fasteners and variants are possible. Alternatively, the annular mounting ring 124 thus coupled, or mounted, to the tubular shell 102 may be permanently affixed to the tubular shell 102 so as rigidly to maintain the annular mounting ring 124 in the mounted and coupled state. For example, once the annular mounting ring 124 is coupled and mounted to the tubular shell 102 as described above, it may be durably and permanently affixed to the tubular shell 102 by forming welds along one or both annular circumferential seams 153 formed inside and outside the tubular shell 102 where respective inner and outer surfaces of the tubular shell 102 and corresponding inner and outer structures forming the annular coupling slot 150 meet.

As shown particularly in FIGS. 6 and 7, the annular mounting ring 124 may further have an annular drainage channel 154 continuous, or in communication, with the annular coupling slot 150, and having a radial width less than a radial width of the annular coupling slot 150. As such, the annular mounting ring 124 may have at the juncture of the annular coupling slot 150 and the annular drainage channel 154 at least one, which may be two, which may be radially inner and outer, annular mounting stop 156, being a corresponding annular shoulder formed by the respective inner walls defining the annular coupling slot 150 and the annular drainage channel 154 where they meet. Thus, the annular mounting stop 156 may provide a definite and preconfigured depth of insertion of the annular edge 152 of the tubular shell 102 in the annular coupling slot 150 of the annular mounting ring 124 when the annular mounting ring 124 is mounted and coupled onto the tubular shell 102. Such preconfigured axial alignment of the annular mounting ring 124 and the tubular shell 102 may facilitate affixation of the annular mounting ring 124 to the tubular shell 102 as described above, for example by facilitating axial alignment of the corresponding through holes and threaded holes, or by optimal positioning of the annular mounting ring 124 for welding.

In addition, the annular drainage channel 154 may enable escape of fluids from the annular coupling slot 150 or the tubular shell 102 when the annular edge of the tubular shell 102 is received therein. For example, when the tubular shell 102 is formed of longitudinally extruded panels which form interior longitudinal channels, such as in PCT International Publication No. WO 2018/112622A1 ("the PCT Publication"), the entirety of which is incorporated herein by reference, when these channels contain or transport any fluid, such as water or leachate, the annular drainage channel 154 may enable passage of the fluid out of the interior longitudinal channels of the panels into the annular drainage channel 154. The annular mounting ring 124 may further have at one or more circumferential locations an escape channel 161 communicating between either a radially inner surface 157 of the annular mounting ring 124 or a radially outer surface 159 of the annular mounting ring 124 (as shown in FIG. 7). In particular, the escape channel may be provided at a vertical lower or bottom edge of the annular mounting ring 124 when the annular mounting ring 124 is mounted to the tubular shell 102. In such case, the fluid received in the annular drainage channel 154 may flow by force of gravity through the annular drainage channel 154 to or near the vertical lower or bottom edge of the annular mounting ring 124 and out of the escape channels. Where it is acceptable or desirable for the fluid to pass outside of the container 100, the escape channels may be provided between a radially outer surface 159 of the annular mounting ring 124 and the annular drainage channel 154, as shown in FIGS. 6 and 7. Where, however, it is unacceptable or undesirable for the fluid to pass outside of the container 100—for example, where the container 100 is intended to contain cargo which generates leachate which is characterized as an environmental hazard, as may be the case where the cargo is municipal or industrial waste—the escape channels may be provided between a radially inner surface 157 of the annular mounting ring 124 and the annular drainage channel 154. In such case, the fluid may empty into the interior of the container 100. When the tubular shell 102 is instead formed with a tubular wall lacking any channel, for example is instead solid sheet material, then the annular drainage channel 154 and the escape channel 161 may instead, or additionally, function to relieve air pressure generated in the annular coupling slot 150 when the annular edge of the tubular shell 102 is inserted therein, thereby facilitating mounting of the annular mounting ring 124 to the tubular shell 102.

The mounting ring annular flange 136 and a axially forward annular face of a rear wall of the annular drainage channel 154, or of the annular coupling slot 150 if the annular drainage channel 154 is omitted, may together form therebetween an annular notch sized and shaped to receive an axially forward arm 126 of the clamping collar 122 when it is installed to clamp the mounting wedge 140 as described herein.

Thus, as described above, the annular mounting ring 124 rigidly mounted to the tubular shell 102 of the container 100 may enable reversible rigid mounting of the nose cone 108, so as to form an assembled container 100 with a nose cone 108, which may be of a material different from a material of the tubular shell 102. Moreover, a material of the annular mounting ring 124 may be the same as, or different from, either one of the nose cone 108 and tubular shell 102, and may include metal, which may be steel or aluminum.

Such a configuration provides numerous advantages. For example, the nose cone 108 may be wearable part, and may be easily replaced as needed by use of the mounting apparatus 120. Moreover, different nose cones 108 of different material or construction may be desirable in different applications, such as for use with different types of cargo, and again the disclosed configuration enables rapid and easy replacement of the nose cone 108 for this purpose. Moreover, the ability easily and quickly to remove and replace the nose cone 108 enables where appropriate selective unloading of the cargo container 100 from the front end 106 thereof as well as the rear end 104, either routinely or where in some specific situation unloading from the rear end 104 proves to be difficult or impossible. In some embodiments, the rear end 104 has a rear opening for unloading the cargo container 100, and may include a tailgate, as is known in the art. In other embodiments, the rear end 104 may be enclosed by a rear wall, and loading and unloading may be performable entirely via a front opening at the front end, selectively opened and closed by rapid and easy removal and replacement of the nose cone 108 as described herein.

The annular mounting ring 124 may be used in a sense as an adapter to enable mounting of the nose cone 108 onto any pre-existing tubular shell 102. Thus, the mounting apparatus 120 including the annular clamping collar 122 and the annular mounting ring 124 may be provided as a kit to enable mounting the nose cone 108 with a nose cone annular flange 112 onto any tubular shell 102.

The annular mounting ring 124 may be so sized and shaped as to provide yet further advantages beyond those described above. For example, and as shown particularly in FIG. 3, the nose cone 108, the annular mounting ring 124, the annular clamping collar 102, and the tubular shell 102 may be respectively so sized and shaped that when the container 100 is assembled as described above, a radially outward extension of the nose cone annular flange 112 beyond a radially outward surface of the tubular shell 102 may be minimized, or even more advantageously such maximum radially outward extension of the nose cone annular flange 112 may be entirely radially within the radially outward surface of the tubular shell 102. Moreover, these components may be relatively and respectively sized and shaped such that a radially outward extension of any part beyond the radially outward surface of the tubular shell 102 may be minimized. In particular, the annular mounting ring 124, the annular clamping collar 102, and the tubular shell 102 may be configured such that when the container 100 is assembled, respective radially outward surfaces of these components are flush, or nearly flush. In this way, an optimally aerodynamic outer surface of the container 100 may be provided.

As shown particularly, in FIG. 7, such an arrangement may be achieved in part by providing a preconfigured relative radial position of the radially outward surface 147 of the annular clamping stop 144, which, when the nose cone 108 is clamped to the annular mounting ring 124, defines a maximum radially inward deflection of the circular rim 110 and nose cone annular flange 112, which, given a preconfigured radial thickness of the nose cone annular flange 112, which, together with a preconfigured radial thickness of the mounting ring annular flange 136, define a preconfigured radial thickness of the mounting wedge 140, which, together with a preconfigured radial depth of the annular groove 134 of the clamping collar 122, define a maximum radial extension of the mounting edge 140 and clamping collar 122 together, and thus a radially outward surface 164 of the clamping collar 122, whereby such radially outer surface 164 of the clamping collar 122, a radially outward surface 166 of the annular mounting ring 124, and a radially outward surface 168 of the tubular shell 102, may be preconfigured to be flush (i.e. coincident in a common cylindrical shell), or optimally or nearly so. In other words, the annular clamping stop 144 of the annular mounting ring 124 may be radially inwardly offset from an interior, radially inward surface 170 of the tubular shell 102 so as to enable the circular rim 110 and nose cone annular flange 112 of the nose cone 108 likewise to be sufficiently radially inwardly offset from an exterior, radially outward surface 168 of the tubular shell 102 to provide radial space for the clamping collar 122 and thus enable the provision of maximally flush radially outer surfaces of the clamping collar 122, annular mounting ring 124, and tubular shell 102. Once again, doing so may optimize an aerodynamic profile of the assembled container 100, with the advantages of reduced aerodynamic drag and resulting fuel consumption.

The tubular shell 102 may be of any desired length, and in some embodiments has a length of between 20' and 100' (6.096 m and 30.48 m), or between 40' and 80' (12.192 m and 24.384 m), or between 50' and 60' (15.24 m and 18.288 m), or about 56' (17.0688 m), or about 53' (16.1544 m). A tubular wall of the tubular shell may be of any desired thickness, and in some embodiments has a thickness of between 0.5" and 6" (1.27 cm and 15.24 cm), or between 1" and 4" (2.54 cm and 10.16 cm), or about 1.5" (3.81 cm). The tubular shell 102 may be characterized by any desired radius, and in some embodiments has a radius of between 2.5' and 6' (0.762 m and 1.8288 m), or between 3.5' and 5' (1.0668 m and 1.524 m), or about 51" (1.2954 m), which may be measured from a longitudinal axis of the tubular shell 102 to either a radially interior surface of the tubular shell 102 or to a radially exterior surface of the tubular shell 102.

Other materials and manufacturing techniques are possible, and the principles disclosed herein are not necessarily limited to any particular materials or manufacturing techniques. For example, the principles disclosed herein may be applicable where nose cone 108 or tubular shell 102 are formed of non-metals including plastics, for example thermoplastics, including for example high density polyethylene, or fiberglass. So long as the components are sufficiently rigid and strong in view of the principles disclosed herein, any and all different materials, dimensions, and manufacturing techniques are possible.

The cargo container described herein be used for or form a part of a tanker truck, or a semi-trailer, or a trailer, or a railcar, or any other device or vehicle having a container functional to store and carry cargo. For such purpose, the cargo container may be mounted on a wheeled suspension, and may have means for attachment to a truck, locomotive, another cargo car, or any other device or vehicle to tow or propel or move the cargo container, and such means may include a hitch, fifth wheel, or other attachment device or mechanism.

The following are examples according to the disclosure herein.

Example 1. A cargo container comprising: a tubular shell formed of hollow-core extruded aluminum panels; an annular mounting ring; a hemispherical or paraboloid nose cone formed of fiberglass; and an annular clamping collar, wherein: the tubular shell has a longitudinal axis and a generally circular cross-section defining a radial direction, a forward end, and an axially forward annular edge; the annular mounting ring has an axially rearwardly facing annular coupling slot, an axially rearwardly facing annular drainage channel adjacent the annular coupling slot, a radially outwardly tapering mounting ring annular flange, and an axially forwardly extending annular clamping stop; the nose cone has an axially outwardly tapering nose cone annular flange at or adjacent a generally circular rim defining an axially rearwardly facing opening of the nose cone; the clamping collar has a radially inwardly facing and radially outwardly tapering annular groove, and a constriction device operative selectively to circumferentially constrict the clamping collar; the annular mounting ring is mounted to the tubular shell wherein the forward annular edge of the tubular shell is rigidly held in the annular coupling slot; the nose cone is coupled in axial alignment to the annular mounting ring wherein an axially rearward annular face of the nose cone annular flange contacts an opposing axially forward annular face of the mounting ring annular flange, wherein the nose cone annular flange and mounting ring annular flange together form an annular radially outwardly tapered mounting wedge; and the clamping collar clamps the nose cone to the annular mounting ring, wherein the mounting wedge is rigidly held in the annular groove by constriction of the clamping collar by the constriction device, and a radially inward annular surface of the nose cone circular rim contacts a radially outward annular surface of the annular clamping stop.

Example 2. A cargo container comprising: a tubular shell; an annular mounting ring; a nose cone; and an annular clamping collar, wherein: the tubular shell has a longitudinal axis and a generally circular cross-section defining a radial direction, a forward end, and an axially forward annular edge; the annular mounting ring has an axially rearwardly facing annular coupling slot, and a radially outwardly extending mounting ring annular flange; the nose cone has an axially outwardly extending nose cone annular flange at or adjacent a generally circular rim defining an axially rearwardly facing opening of the nose cone; the clamping collar has a radially inwardly facing annular groove, and a constriction device operative selectively to circumferentially constrict the clamping collar; the annular mounting ring is mounted to the tubular shell wherein the forward annular edge of the tubular shell is rigidly held in the annular coupling slot; the nose cone is coupled in axial alignment to the annular mounting ring wherein an axially rearward annular face of the nose cone annular flange contacts an opposing axially forward annular face of the mounting ring annular flange, wherein the nose cone annular flange and mounting ring annular flange together form a mounting wedge; and the clamping collar clamps the nose cone to the annular mounting ring, wherein the mounting wedge is rigidly held in the annular groove by constriction of the clamping collar by the constriction device.

Example 3. The cargo container according to Example 2, wherein the nose cone is hemispherical or paraboloid.

Example 4. The cargo container according to Example 2 or 3, wherein the annular mounting ring further has an axially rearwardly facing annular drainage channel adjacent the annular coupling slot.

Example 5. The cargo container according to any one of Examples 2-4, wherein the annular mounting ring further has an axially forwardly extending annular clamping stop.

Example 6. The cargo container according to Example 5, wherein a radially inward annular surface of the nose cone circular rim contacts a radially outward annular surface of the annular clamping stop.

Example 7. The cargo container according to any one of Examples 2-6, wherein the annular groove of the clamping collar tapers radially outwardly.

Example 8. The cargo container according to any one of Examples 2-7, wherein the annular mounting wedge tapers radially outwardly.

Example 9. The cargo container according to any one of Examples 2-7, wherein the annular mounting ring has at least one escape channel communicating between the annular drainage channel and an exterior of the annular mounting ring.

Example 10. The cargo container according to Example 9, wherein the at least one escape channel communicates between the annular drainage channel and a radially inner surface of the annular mounting ring.

Example 11. The cargo container according to Example 9 or 10, wherein the at least one escape channel communicates between the annular drainage channel and an interior of the tubular shell.

Example 12. The cargo container according to Example 9, wherein the at least one escape channel communicates between the annular drainage channel and a radially outer surface of the annular mounting ring.

Example 13. The cargo container according to Example 9 or 12, wherein the at least one escape channel communicates between the annular drainage channel and an exterior of the container.

Example 14. The cargo container according to any one of Examples 9-13, wherein the at least one escape channel is at or near a vertically lower or bottom edge of the annular mounting ring.

Example 15. The cargo container according to any one of Examples 2-14, wherein the tubular shell is formed of hollow-core extruded panels.

Example 16. The cargo container according to Example 15, wherein the hollow-core extruded panels are formed of aluminum.

Example 17. The cargo container according to any one of Examples 2-16, wherein the nose cone is formed of plastic.

Example 18. The cargo container according to Example 17, wherein the nose cone is formed of plastic fiber-reinforced plastic.

Example 19. The cargo container according to Example 18, wherein the nose cone is formed of fiberglass.

Example 20. The cargo container according to any one of Examples 2-16, wherein the nose cone is formed of metal.

Example 21. The cargo container according to Example 20, wherein the nose cone is formed of aluminum.

Example 22. The cargo container according to any one of Examples 2-21, wherein the annular mounting ring is bolted to the tubular shell.

Example 23. The cargo container according to any one of Examples 2-21, wherein the annular mounting ring is welded to the tubular shell.

Example 24. A cargo container comprising a tubular shell, a nose cone, an annular mounting ring mounted to an annular opening of the tubular shell, and an annular clamping collar reversibly clamping the nose cone to the annular mounting ring.

Example 25. An annular mounting ring for mounting a nose cone to a tubular shell of a cargo container, the annular mounting ring having a generally circular cross-section defining an axial direction and a perpendicular radial direction in a plane of the cross-section, the annular mounting ring comprising: an axially rearwardly facing annular coupling slot; a radially outwardly extending mounting ring annular flange spaced axially forwardly from the coupling slot.

Example 26. The annular mounting ring according to Example 25, wherein the mounting ring annular flange tapers radially outwardly.

Example 27. The annular mounting ring according to Example 25 or 26, further comprising: an axially rearwardly facing annular drainage channel in communication with the annular coupling slot.

Example 28. The annular mounting ring according to any one of Examples 25-27, further comprising an axially forwardly extending annular clamping stop spaced radially inwardly from the coupling slot.

Example 29. An annular clamping collar for mounting a nose cone to a tubular shell of a cargo container, the annular clamping collar having a generally circular cross-section defining an axial direction and a perpendicular radial direction in a plane of the cross-section, the annular clamping collar comprising: a radially inwardly facing annular groove; and a constriction device operative selectively to circumferentially constrict the clamping collar.

Example 30. The annular clamping collar according to Example 29, wherein the annular groove is generally U-shaped.

Example 31. The annular clamping collar according to Example 29 or 30, wherein the annular groove tapers radially outwardly.

Example 32. A kit for mounting a nose cone to a tubular shell of a cargo container, the kit comprising: the annular mounting ring according to any one of Examples 25-28; and the annular clamping collar according to any one of Examples 29-31.

Example 33. The kit according to Example 32, further comprising: instructions for mounting the nose cone to the tubular shell using the annular mounting ring and the annular clamping collar.

In the preceding description, for purposes of explanation, numerous details are set forth in order to provide a thorough understanding of the embodiments. However, it will be apparent to one skilled in the art that these specific details are not required. In particular, it will be appreciated that the various additional features shown in the drawings are generally optional unless specifically identified herein as required. The above-described embodiments are intended to be examples only. Alterations, modifications and variations can be effected to the particular embodiments by those of skill in the art. The scope of the Examples should not be limited by the particular embodiments set forth herein, but should be construed in a manner consistent with the specification as a whole.

Having thus described the system and method in detail, it is to be understood that the foregoing description is not intended to limit the spirit or scope thereof. It will be understood that the embodiments of the present disclosure described herein are merely exemplary and that a person skilled in the art may make any variations and modification without departing from the spirit and scope of the disclosure. All such variations and modifications, including those discussed above, are intended to be included within the scope of the disclosure.

What is claimed is:

1. A cargo container comprising:
a tubular shell;
an annular mounting ring;
a nose cone; and
an annular clamping collar,
wherein:
the tubular shell has a longitudinal axis and a generally circular cross-section defining a radial direction, a forward end, and an axially forward annular edge;
the annular mounting ring has an axially rearwardly facing annular coupling slot, and a radially outwardly extending mounting ring annular flange;
the nose cone has a radially outwardly extending nose cone annular flange at or adjacent a generally circular rim defining an axially rearwardly facing opening of the nose cone;

the clamping collar has a radially inwardly facing annular groove, and a constriction device operative selectively to circumferentially constrict the clamping collar;

the annular mounting ring is mounted to the tubular shell wherein the forward annular edge of the tubular shell is rigidly held in the annular coupling slot;

the nose cone is coupled in axial alignment to the annular mounting ring wherein an axially rearward annular face of the nose cone annular flange contacts an opposing axially forward annular face of the mounting ring annular flange, wherein the nose cone annular flange and mounting ring annular flange together form a mounting wedge; and the clamping collar clamps the nose cone to the annular mounting ring, wherein the mounting wedge is rigidly held in the annular groove by constriction of the clamping collar by the constriction device.

2. The cargo container according to claim 1, wherein the nose cone is hemispherical or paraboloid.

3. The cargo container according to claim 1, wherein the annular mounting ring further has an axially rearwardly facing annular drainage channel adjacent the annular coupling slot.

4. The cargo container according to claim 1, wherein the annular mounting ring further has an axially forwardly extending annular clamping stop.

5. The cargo container according to claim 4, wherein a radially inward annular surface of the nose cone circular rim contacts a radially outward annular surface of the annular clamping stop.

6. The cargo container according to claim 1, wherein the annular groove of the clamping collar tapers radially outwardly.

7. The cargo container according to claim 1, wherein the annular mounting wedge tapers radially outwardly.

8. The cargo container according to claim 3, wherein the annular mounting ring has at least one escape channel communicating between the annular drainage channel and an exterior of the annular mounting ring.

9. The cargo container according to claim 8, wherein the at least one escape channel communicates between the annular drainage channel and a radially inner surface of the annular mounting ring.

10. The cargo container according to claim 9, wherein the at least one escape channel communicates between the annular drainage channel and an interior of the tubular shell.

11. The cargo container according to claim 8, wherein the at least one escape channel communicates between the annular drainage channel and a radially outer surface of the annular mounting ring.

12. The cargo container according to claim 11, wherein the at least one escape channel communicates between the annular drainage channel and an exterior of the container.

13. The cargo container according to claim 8, wherein the at least one escape channel is at or near a vertically lower or bottom edge of the annular mounting ring.

14. The cargo container according to claim 1, wherein the tubular shell is formed of hollow-core extruded panels.

15. The cargo container according to claim 14, wherein the hollow-core extruded panels are formed of aluminum.

16. The cargo container according to claim 1, wherein the nose cone is formed of fibreglass.

17. The cargo container according to claim 1, wherein the nose cone is formed of aluminum.

18. The cargo container according to claim 1, wherein the annular mounting ring is bolted to the tubular shell.

19. The cargo container according to claim 1, wherein the annular mounting ring is welded to the tubular shell.

20. A kit for mounting a nose cone to a tubular shell of a cargo container, the tubular shell having a generally circular cross-section defining an axial direction and a perpendicular radial direction in a plane of the cross-section, the kit comprising:

an annular mounting ring comprising a monolithic annular mounting ring body comprising:

an axially rearwardly facing annular coupling slot sized and shaped to receive a forward annular edge of the tubular shell, wherein the annular mounting ring body comprises a radially outer axially rearwardly extending annular flange, a concentric radially inner axially rearwardly extending annular flange, and an annular coupling slot base radially bridging the radially outer axially rearwardly extending annular flange and the radially inner axially rearwardly extending annular flange, wherein the radially outer axially rearwardly extending annular flange, the radially inner axially rearwardly extending annular flange, and the annular coupling slot base together define the coupling slot therebetween, and wherein a radial cross-section of the annular coupling slot is U-shaped; and a radially outwardly extending mounting ring annular flange spaced axially forwardly from the coupling slot, wherein the radially outwardly extending mounting ring annular flange and the annular coupling slot base together define a radially extending gap axially therebetween; and an annular clamping collar comprising:

a monolithic annular clamping collar body comprising a radially inwardly facing annular groove having a U-shaped radial cross-section; and a constriction device operative selectively to circumferentially constrict the clamping collar.

* * * * *